US008678434B2

United States Patent
Lee et al.

(10) Patent No.: US 8,678,434 B2
(45) Date of Patent: Mar. 25, 2014

(54) AUXILIARY APPARATUS OF CARRIER FOR VEHICLES

(75) Inventors: Seung Mok Lee, Gunpo-si (KR); Hee Chan Yang, Hwaseong-si (KR); Dong Eun Cha, Seongnam-si (KR); Nam Cheol Kim, Suwon-si (KR); Kwang Jae Choi, Hwaseong-si (KR); Ju Yong Park, Cheongju-si (KR); Jo Han Kim, Hwaseong-si (KR); Yong Won Jeong, Hwaseong-si (KR); Kwang Sup Jeong, Suwon-si (KR); Jeong Ho Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 1000 days.

(21) Appl. No.: 12/768,344

(22) Filed: Apr. 27, 2010

(65) Prior Publication Data

US 2011/0094986 A1    Apr. 28, 2011

(30) Foreign Application Priority Data

Oct. 26, 2009 (KR) ................... 10-2009-0101638

(51) Int. Cl.
*B60P 3/32* (2006.01)
(52) U.S. Cl.
CPC ................................ *B60P 3/32* (2013.01)
USPC .................. 280/768; 280/760; 280/769
(58) Field of Classification Search
USPC ......... 280/760, 769, 768, 495; 224/501, 532, 224/536
See application file for complete search history.

(56) References Cited

U.S. PATENT DOCUMENTS

| 1,682,313 | A | * | 8/1928 | Turner | 280/760 |
| 2,870,820 | A | * | 1/1959 | Turnipseed | 280/760 |
| 4,798,409 | A | * | 1/1989 | Miller | 280/769 |
| 5,460,304 | A | * | 10/1995 | Porter et al. | 224/532 |
| 6,948,645 | B2 | * | 9/2005 | Pierce et al. | 224/501 |
| 8,011,543 | B2 | * | 9/2011 | Premartin et al. | 280/769 |
| 2008/0007040 | A1 | * | 1/2008 | Maucher et al. | 280/769 |

* cited by examiner

*Primary Examiner* — Hau Phan
(74) *Attorney, Agent, or Firm* — Morgan, Lewis & Bockius LLP

(57) ABSTRACT

Disclosed herein is an auxiliary apparatus of a carrier mounted to a rear portion of a vehicle, including a locking unit fastened to the carrier, the locking unit including a locking pin to be extracted or retracted in response to operation of a switch unit, a rotary plate rotatably coupled to the locking unit, and a fastening member mounted to the rotary plate, the fastening member having at least a fastening hole into which the locking pin is selectively inserted and locked according to the operation of the switch unit.

7 Claims, 8 Drawing Sheets

AUXILIARY APPARATUS OF CARRIER FOR VEHICLES

CROSS-REFERENCE TO RELATED APPLICATION

The present application claims priority to Korean Patent Application No. 10-2009-0101638, filed on Oct. 26, 2009, the entire contents of which is incorporated herein for all purposes by this reference.

BACKGROUND OF THE INVENTION

1. Field of the Invention

The present invention relates generally to auxiliary apparatuses of carriers for vehicles and, more particularly, to an auxiliary apparatus which is mounted to a carrier fastened to a rear portion of a vehicle so as to ensure the visibility of the vehicle.

2. Description of Related Art

Generally, to carry a bicycle or the like using a vehicle to, for example, a park or a peripheral road, a separate carrier for loading the bicycle on the vehicle is required. Typically, such a carrier for loading a bicycle or the like is provided on the roof or the rear portion of the vehicle.

However, in the case of the carrier being provided on the rear portion of the vehicle, the carrier or the bicycle loaded on the carrier covers the rear lights or the license plate which is installed on the rear portion of the vehicle, thus deteriorating the visibility of the vehicle. This causes the number of accidents to increase.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an auxiliary apparatus of a carrier for a vehicle in which even if the carrier for loading a bicycle or the like on the vehicle is mounted to the rear portion of the vehicle, the visibility of a license plate and rear lights of the vehicle can be ensured.

In an aspect of the present invention, the auxiliary apparatus mounted to a carrier provided on a rear portion of a vehicle may include a locking unit fastened to the carrier, the locking unit including a locking pin to be extracted or retracted in response to operation of a switch unit, a rotary plate rotatably coupled to the locking unit, and a fastening member mounted to the rotary plate, the fastening member having at least a fastening hole into which the locking pin is selectively inserted and locked according to the operation of the switch unit, wherein the rotary plate is rotatably coupled to the locking unit by a rotating shaft.

The locking unit may include a mounting bracket fastened to the carrier, the locking pin slidably coupled to and elastically supported on the mounting bracket by an elastic spring to one direction, and the switch unit connected to the locking pin through an actuating cable to extract or retract the locking pin to selectively lock the locking pin into the at least a fastening hole of the fastening member.

The auxiliary apparatus may further include auxiliary lights coupled to both ends of the rotary plate so as to be rotatable in a lateral direction of the vehicle, and a fastening handle fastening the corresponding auxiliary light to the rotary plate.

An auxiliary license plate may be attached to one surface of the rotary plate.

A guide may be provided on the rotary plate in a front of the at least a fastening hole of the fastening member, the guide having an inclined portion guiding an end of the locking pin into one of the at least a fastening hole when the rotary plate rotates around the rotating shaft.

The at least a fastening hole may include a first fastening hole formed in a first end of the fastening member so that when the auxiliary license plate is oriented towards a front of the vehicle, the locking pin is locked into the first fastening hole, and a second fastening hole is formed in a second end of the fastening member so that when the rotary plate is rotated approximately 180° around the rotating shaft and oriented rearwards in relation to the vehicle, the locking pin is locked into the second fastening hole.

A first guide may be provided on the rotary plate in a front of the first fastening hole of the fastening member and a second guide may be provided on the rotary plate in a front of the second fastening hole of the fastening member, the first and second guides having a respective inclined portion guiding an end of the locking pin into the first fastening hole by the second guide or into the second fastening hole by the first guide according to the rotation angle of rotary plate.

The first fastening hole, the second fastening hole and the rotating shaft of the rotary plate may be disposed on a same plane.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1A:
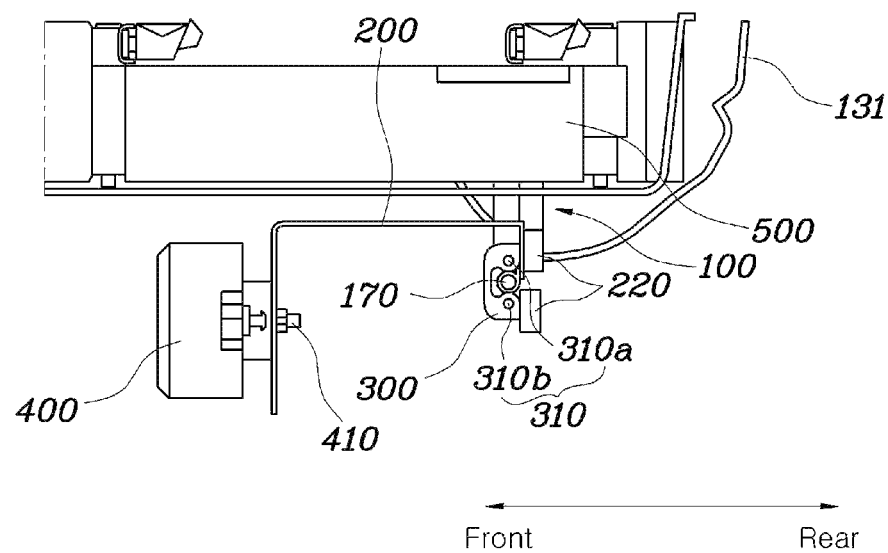
FIG. 1A illustrates the construction of an exemplary auxiliary apparatus of a carrier for vehicles when a rotary plate is in a retracted state, according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1B:
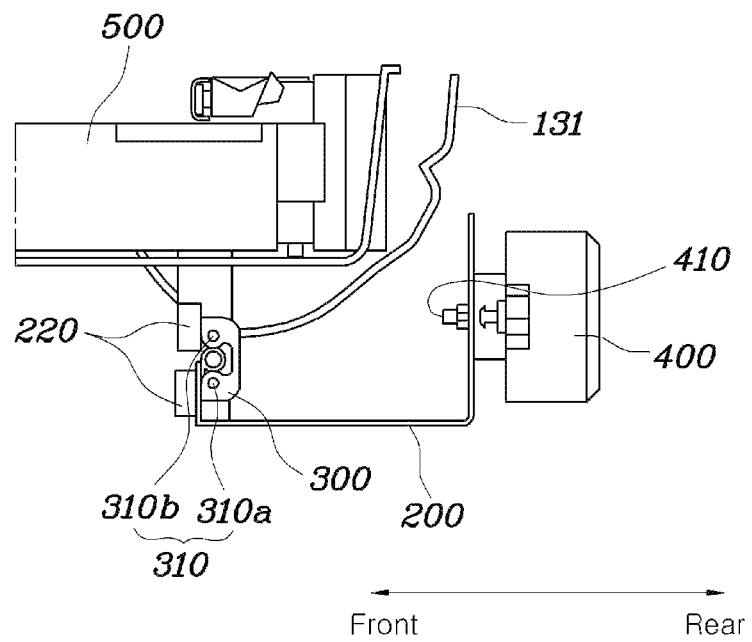
FIG. 1B is a view showing an extracted state of the rotary plate of the exemplary auxiliary apparatus according to the present invention.
Figure 2A:
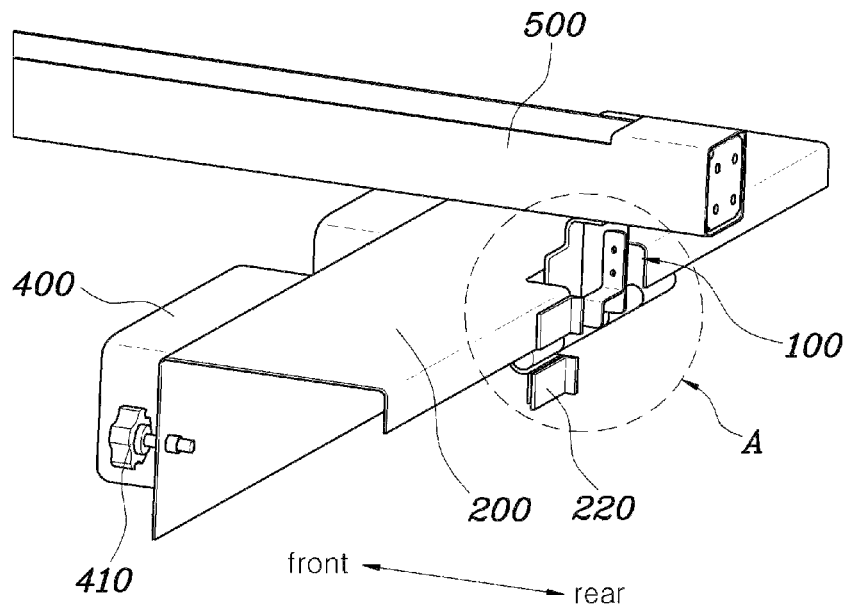
FIG. 2A is a perspective view showing the retracted state of the rotary plate of the exemplary auxiliary apparatus according to the present invention.
Figure 2B:
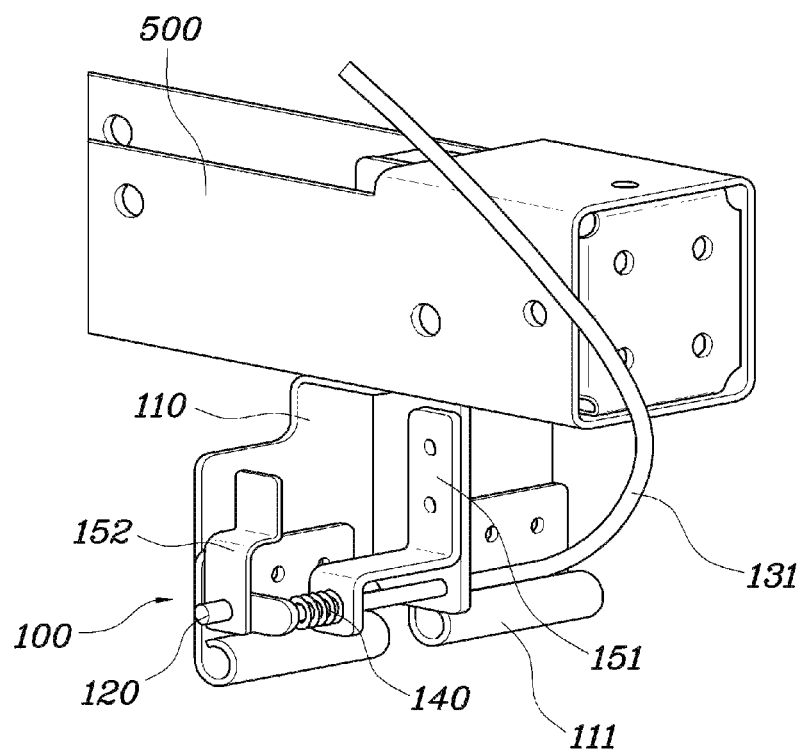
FIG. 2B is an enlarged view of a circled portion "A" of FIG. 2A.

As shown in FIGS. 1A and 1B, an auxiliary apparatus of a carrier for a vehicle according to an exemplary embodiment of the present invention is configured such that a rotary plate 200 is rotatably coupled to a carrier 500 which is mounted to the rear portion of the vehicle. An auxiliary license plate 210 and/or auxiliary rear lights 400 can be installed on the rotary plate 200 to enhance the visibility of the vehicle.

The auxiliary apparatus of the carrier includes a locking unit 100, the rotary plate 200 and a fastening member 300. The locking unit 100 is provided on the carrier 500 mounted to the rear portion of the vehicle. The rotary plate 200 is rotatably coupled to the locking unit 100. The auxiliary license plate 210 is attached to a corresponding one of the surfaces of the rotary plate 200. The fastening member 300 selectively locks the rotary plate 200 thereto. The auxiliary apparatus may further include the auxiliary rear lights 400 which are mounted to both ends of the rotary plate 200.

Below, the auxiliary apparatus in an exemplary embodiment of the present invention will be described in more detail with reference to the drawings to explain the above-mentioned construction more clearly.

As shown in FIGS. 2A through 4B, the carrier 500 holds an object, such as a bicycle, a ski board, a cart, etc., to load the object on the vehicle and carry it. The carrier 500 is mounted to the rear portion of the vehicle. The construction of the carrier 500 is the same as that of a typical carrier for loading an object, such as a bicycle, a ski board, a cart, etc., on a vehicle. Therefore, in the embodiment, only the general structure of the carrier 500 is illustrated, and further explanation will be omitted.

By the way, the carrier 500 is mounted to the rear portion of the vehicle. Thus, the carrier 500 or the object loaded on the carrier 500 may undesirably cover an original license plate or rear lights of the vehicle.

To solve this problem, in the present invention, a separate device which can conduct the functions of the rear lights or license plate of the vehicle is mounted to the carrier 500, such that vehicles which are behind the vehicle having the carrier 500 can easily observe the rear lights or the license plate of the vehicle having the carrier 500.

To achieve the above-mentioned purpose, the locking unit 100, the rotary plate 200 and the fastening member 300 are provided on the rear portion of the carrier 500. The locking unit 100 includes a mounting bracket 110, a locking pin 120 which is elastically supported on the mounting bracket 110 through an elastic spring 140, and a switch unit 130 which selectively pulls the locking pin 120.

The mounting bracket 110 is fastened to the rear portion of the carrier 500. A hinge bracket 111, a first rib 151 and a second rib 152 are provided on the mounting bracket 110. A rotating shaft 170 of the rotary plate 200 is coupled to the hinge bracket 111. The first rib 151 and the second rib 152 respectively support first and second ends of the locking pin 120. In detail, the rotating shaft 170 of the rotary plate 200 is inserted into the hinge bracket 111 such that the rotary plate 200 is rotatable with respect to the mounting bracket 110. The locking pin 120 is provided between the first and second ribs 151 and 152 and elastically supported through the elastic spring 140. The locking pin 120 and the rotating shaft 170 are offset with a predetermined distance.

The locking pin 120 functions to selectively fasten the rotary plate 200 to the locking unit 100. For this, the first end of the locking pin 120 includes a protrusion which is inserted into an insert hole of the first rib 151 and is selectively inserted into one of fastening holes 310 of the fastening member 300 which will be explained later. The second end of the locking pin 120 is inserted into an insert hole of the second rib 152 and connected to the switch unit 130 via an actuating cable 131.

Therefore, when the actuating cable 131 pulls the locking pin 120 by the operation of the switch unit 130, the locking pin 120 which has been locked to the fastening hole 310 of the fastening member 300 is removed from the fastening hole 310 and the elastic spring 140 is compressed.

The switch unit 130 is connected to the second end of the locking pin 120 via the actuating cable 131 and is constructed such that the actuating cable 131 is pulled by pushing the switch unit 130. Thus, when the switch unit 130 is pushed, the actuating cable 131 is pulled, so that the locking pin 120 is removed from the fastening hole 310 of the fastening member 300.

The rotary plate 200 is coupled to the locking unit 100 so as to be rotatable forwards and backwards with respect to the longitudinal direction of the vehicle. The rotary plate 200 is bent such that the cross-section thereof has a "U" shape. The rotary plate 200 is coupled to the hinge bracket 111 of the locking unit 100 through the rotating shaft 170. The auxiliary license plate 210 is attached to the corresponding one surface of the rotary plate 200.

Therefore, from the state in which as shown in FIG. 1A, the rotary plate 200 is oriented towards the front of the vehicle, if the original license plate is covered with a bicycle or the like loaded on the carrier 500, the rotary plate 200 rotates backwards around the rotating shaft 170, as shown in FIG. 1B. Then, vehicles which are behind the vehicle having the carrier 500 can easily observe the rear lights or the license plate of the vehicle having the carrier 500.

The rotary plate 200 which is rotatable forwards and backwards can be fastened to the locking unit 100 by the fastening member 300.

The fastening member 300 is fastened to the rotary plate 200 and has the fastening holes 310. The locking pin 120 of the locking unit 100 is selectively inserted into one of the fastening holes 310, so that the rotary plate 200 is fastened to the locking unit 100.

In particular, the fastening holes 310 of the fastening member 300 include a first fastening hole 310a which is formed in a first end of the fastening member 300, and a second fastening hole 310b which is formed in a second end of the fastening member 300. The locking pin 120 is selectively and removably locked into one of the first and second fastening holes 310a and 310b. In detail, when the auxiliary license plate 210 of the rotary plate 200 is oriented towards the front of the vehicle, in other words, when it is in the retracted state, the locking pin 120 is locked into the first fastening hole 310a. When the auxiliary license plate 210 of the rotary plate 200 is oriented rearwards in relation to the vehicle, in other words, when it is in the extracted state, the locking pin 120 is locked into the second fastening hole 310b.

Here, the first and second fastening holes 310a and 310b are disposed on the same plane as the rotating shaft 170 of the rotary plate 200. Therefore, after the locking pin 120 is removed from the first fastening hole 310a, when the rotary plate 200 rotates 180°, the locking pin 120 can be inserted into the second fastening hole 310b at the same position.

In other words, when the auxiliary license plate 210 of the rotary plate 200 is oriented towards the front of the vehicle, the locking pin 120 is insert into and locked to the first fastening hole 310a. When the auxiliary license plate 210 of the rotary plate 200 is oriented rearwards in relation to the vehicle, the locking pin 120 is inserted into and locked to the second fastening hole 310b.

Meanwhile, a guide 220 having an inclined portion 221 is mounted to the rotary plate 200. When the rotary plate 200 rotates 180°, the guide 220 functions to guide the end of the locking pin 120 into the first fastening hole 310a of the fastening member 300 through the inclined portion 221 or guide the end of the locking pin 120 into the second fastening hole 310b of the fastening member 300 through the inclined portion 221.

Figure 6A:
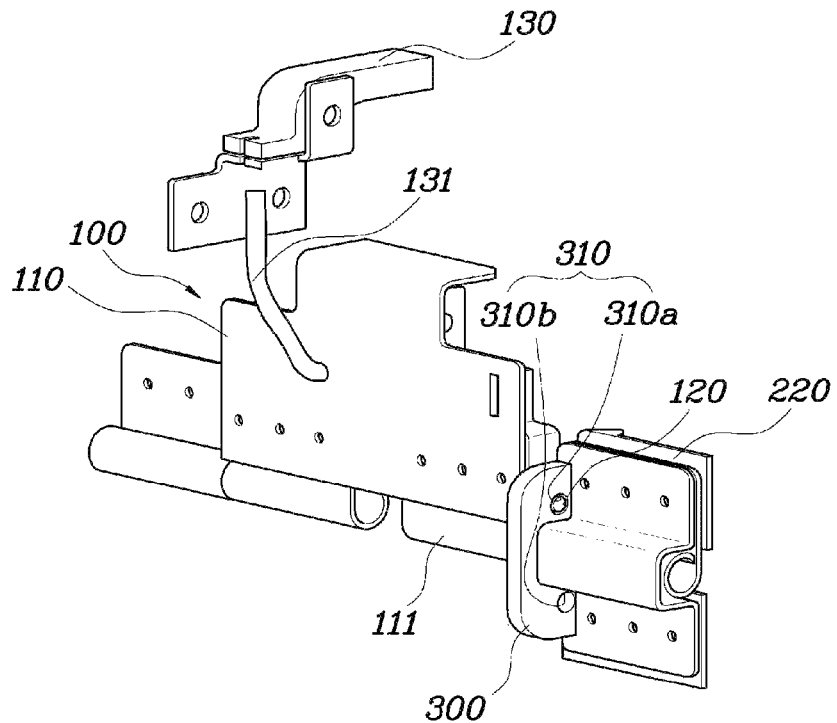
FIG. 6A illustrates the operation of a locking unit of the exemplary auxiliary apparatus when the rotary plate is in the retracted state according to the present invention.
Figure 6B:
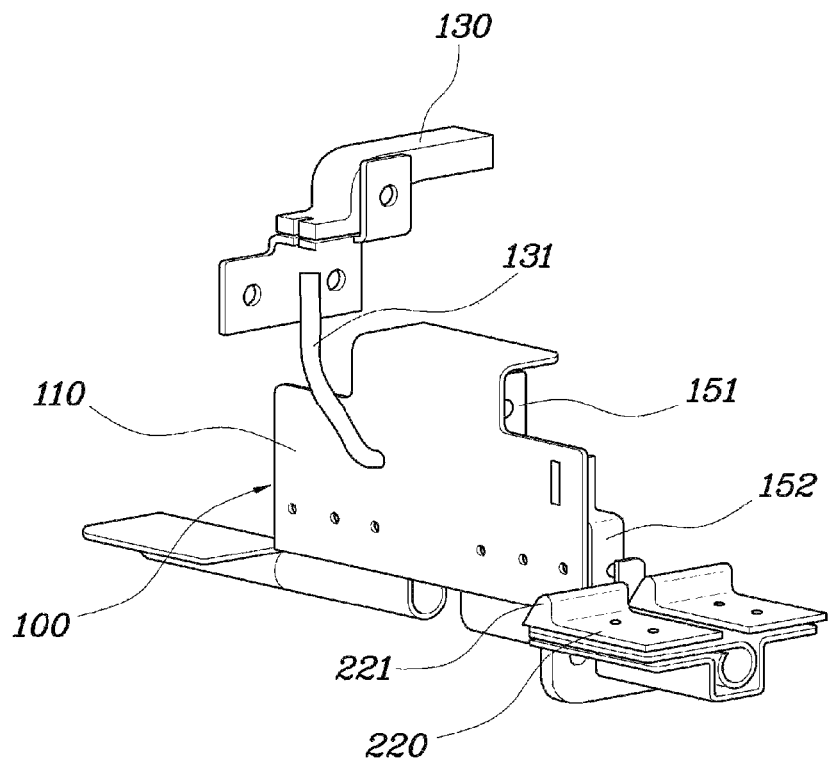
FIG. 6B illustrates the operation of a locking unit of the exemplary auxiliary apparatus when the rotary plate rotates 90° according to the present invention.
Figure 6C:
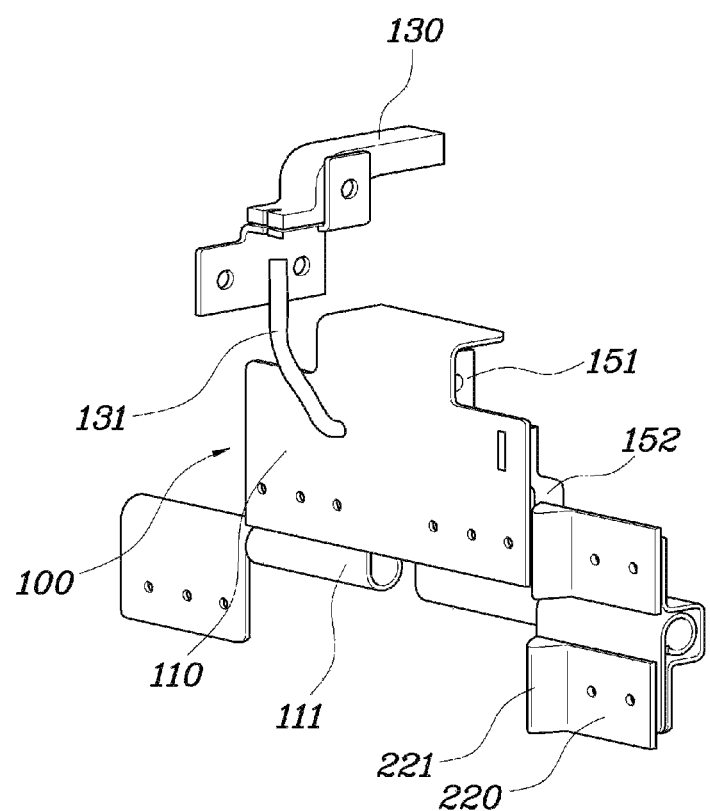
FIG. 6C illustrates the operation of a locking unit of the exemplary auxiliary apparatus when the rotary plate rotates 180° according to the present invention.

For example, as shown in FIG. 6A, when the locking pin 120 is pulled by the actuating cable 131 from the state in which the auxiliary license plate 210 of the rotary plate 200 is oriented towards the front of the vehicle, the elastic spring 140 is compressed and the locking pin 120 is removed from the first fastening hole 310a of the fastening member 300. Thereafter, as shown in FIG. 6B, the locking pin 120 is pushed by the compressed elastic spring 140 as the switch unit 130 is released, and the locking pin 120 is moved along the inclined portion 221 of the guide 220 in a direction away from the guide 220 by the rotation of the rotary plate 200. Subsequently, when the rotary plate 200 rotates 180° such that the auxiliary license plate 210 of the rotary plate 200 is oriented rearwards in relation to the vehicle, as shown in FIG. 6C, the locking pin 120 which has moved along the inclined portion 221 is aligned with the second fastening hole 310b of the fastening member 300 and then inserted into the second fastening hole 310b by the restoring force of the elastic spring 140 which has been compressed.

Figure 5A:
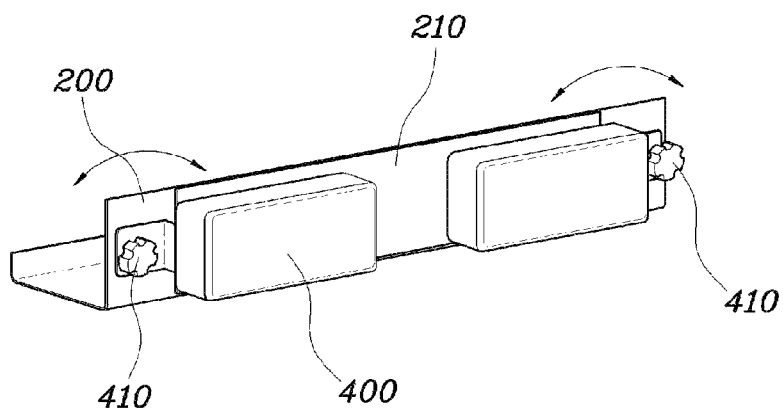
FIGS. 5A and 5B are views showing the expansion of exemplary auxiliary rear lights of the auxiliary apparatus according to the present invention.
Figure 5B:
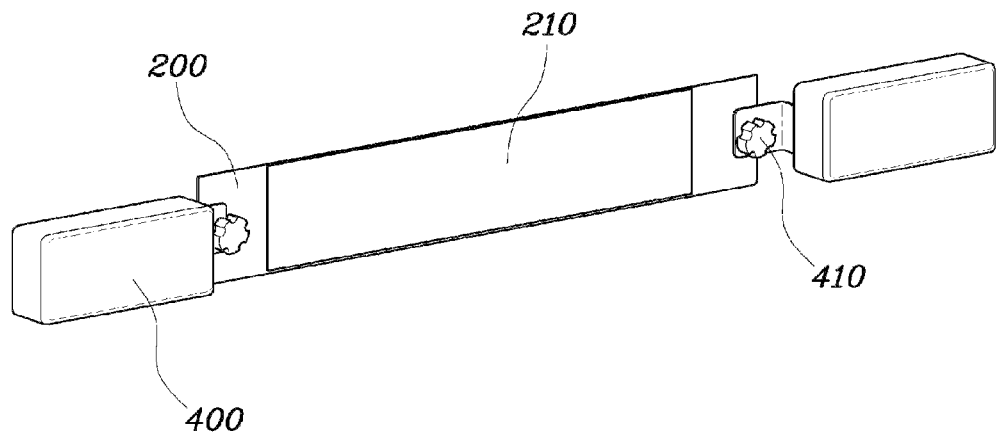

As shown in FIGS. 5A and 5B, the auxiliary apparatus of the carrier according to an exemplary embodiment of the present invention may further include a pair of auxiliary rear lights 400 which are provided on both ends of the rotary plate 200, and fastening handles 410 which fasten the auxiliary rear lights 400 to the rotary plate 200.

The auxiliary rear lights 400 are hinged to both ends of the rotary plate 200 so as to be rotatable in the lateral direction of the vehicle. The hinged portions of the auxiliary rear light 400 are coupled to the rotary plate 200 using the fastening handles 410. The fastening handles 410 fasten the auxiliary rear lights 400 to both ends of the rotary plate 200 in a typical threaded coupling manner. Under normal conditions, the auxiliary rear lights 400 are fastened to the rotary plate 200 by the fastening handles 410 such that the auxiliary rear lights 400 are retained in the state of having overlapped with the rotary plate 200. When the bicycle or the like is loaded on the carrier 500, the auxiliary rear lights 400 are rotated outwards in the lateral direction of the vehicle and fastened to the rotary plate 200 by the fastening handles 410 such that the auxiliary rear lights 400 are retained in the state of having been extracted from the rotary plate 200.

The operation of the present invention having the above-mentioned construction will be explained below.

As shown in FIG. 6A, when the auxiliary license plate 210 of the rotary plate 200 is oriented towards the front of the vehicle, the locking pin 120 is retained in the state of having been locked into the first fastening hole 310a. From this state, the switch unit 130 is pushed to pull the actuating cable 131. Then, the locking pin 120 is pulled by the actuating cable 131, so that the elastic spring 140 is compressed and the locking pin 120 which has been locked to the first fastening hole 310a of the fastening member 300 is removed from the first fastening hole 310a.

Figure 3A:
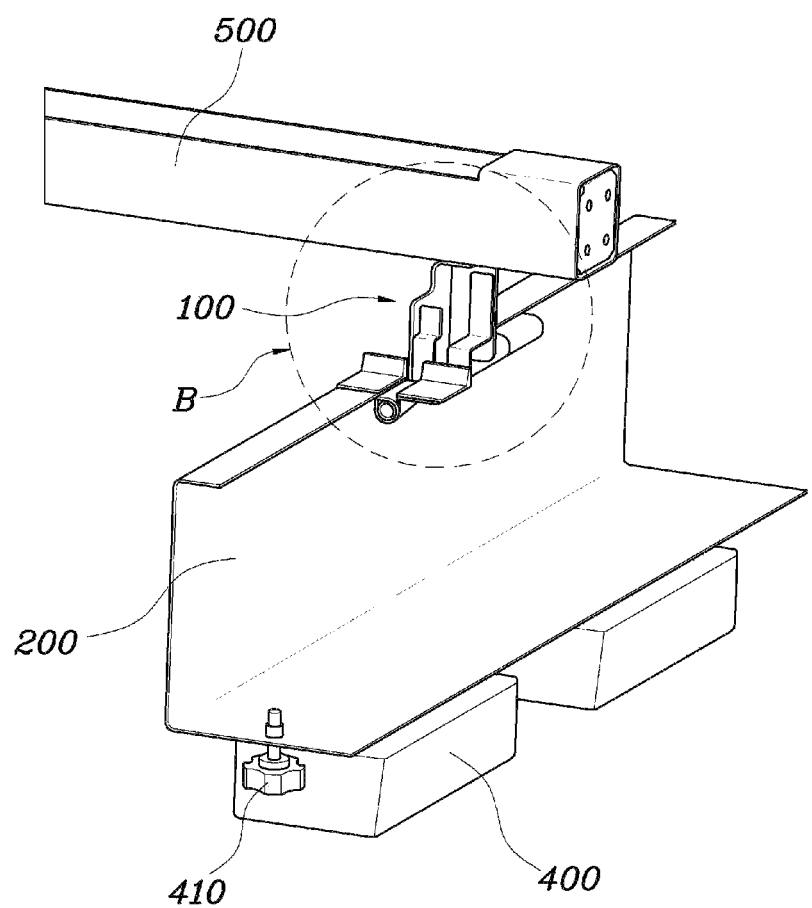
FIG. 3A shows the operation of the exemplary auxiliary apparatus when the rotary plate rotates 90° from the retracted state according to the present invention.
Figure 3B:
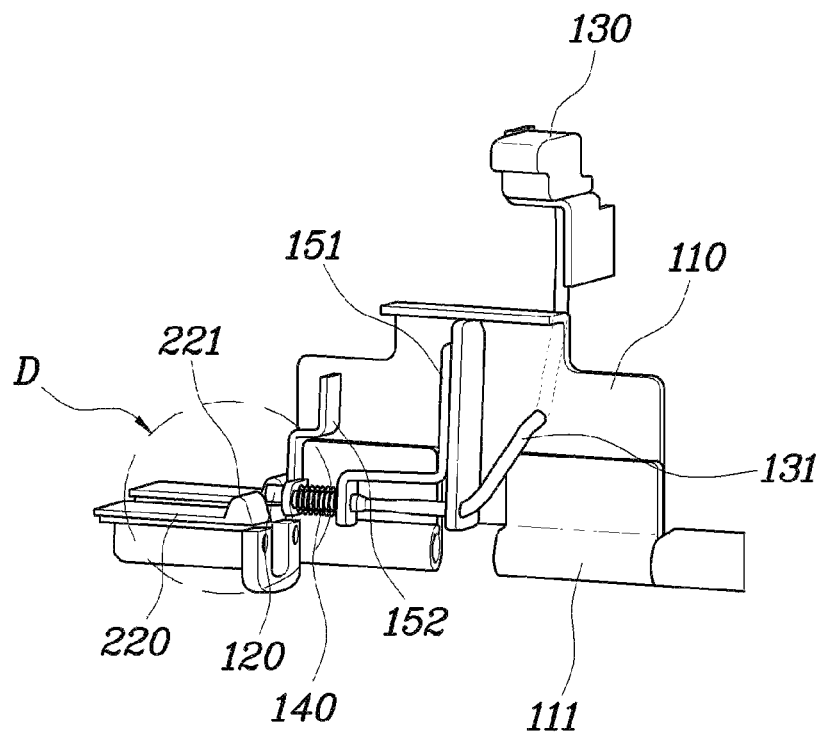
FIG. 3B is an enlarged view of the circled portion "B" of FIG. 3A.
Figure 3C:
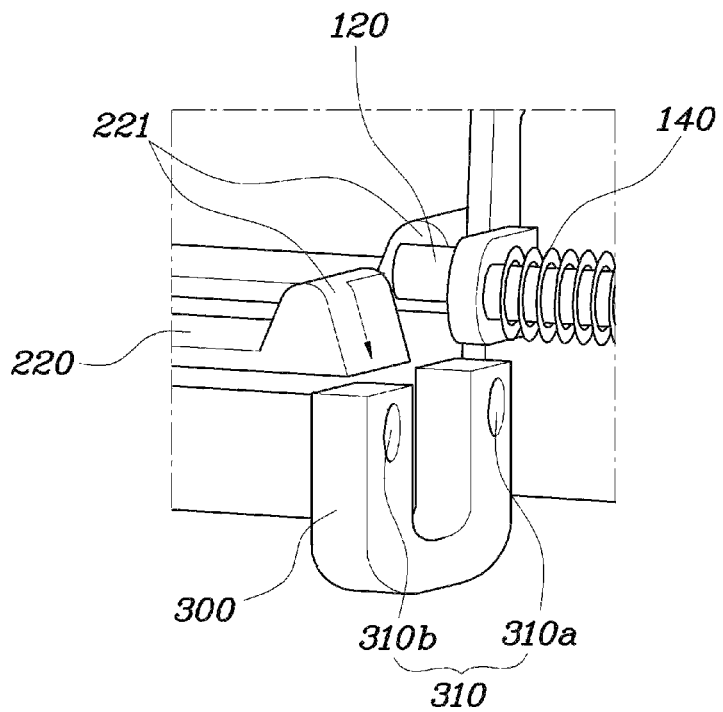
FIG. 3C is an enlarged view of the circled portion "D" of FIG. 3B.
Figure 4A:
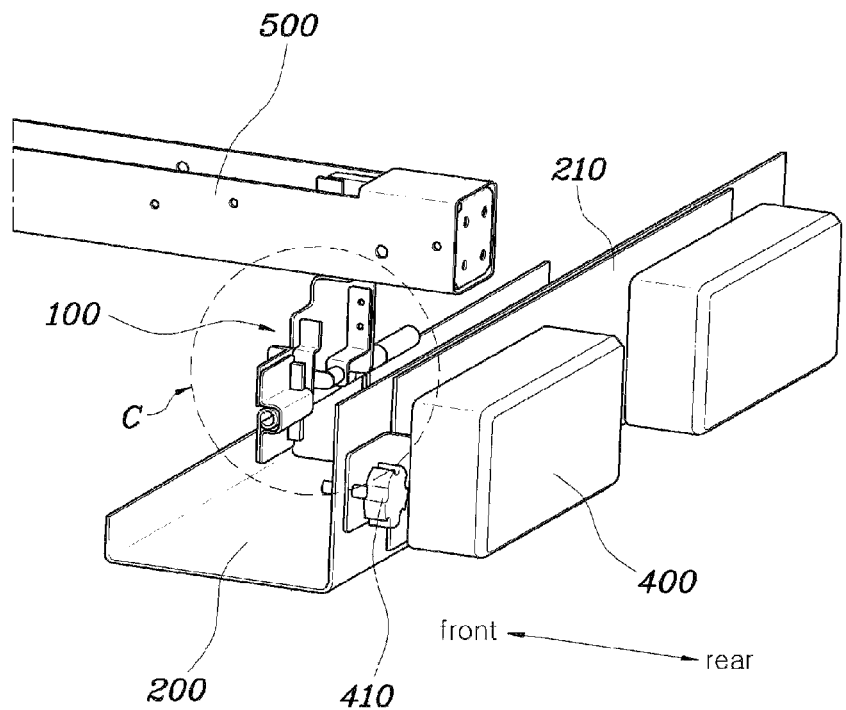
FIG. 4A shows the operation of the exemplary auxiliary apparatus when the rotary plate rotates 180° from the retracted state according to the present invention.
Figure 4B:
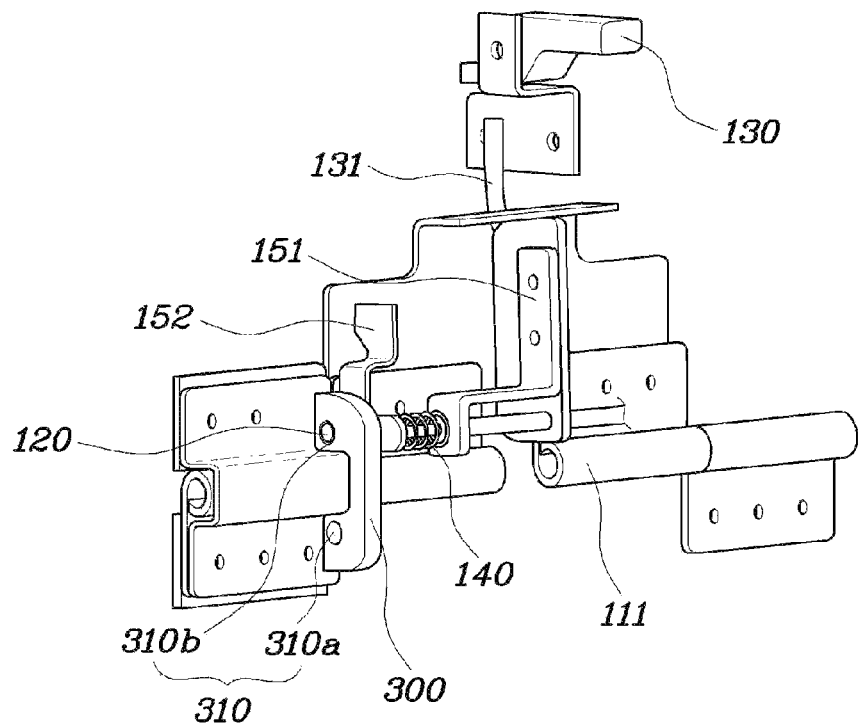
FIG. 4B is an enlarged view of a circled portion "C" of FIG. 4A.

As shown in FIG. 6B, when the locking pin 120 is removed from the first fastening hole 310a, the rotary plate 200 is rotated 90° in a counterclockwise direction by its own weight. At this time, as shown in FIGS. 3B and 3C, the locking pin 120 which has been pulled by the actuating cable 131 and removed from the first fastening hole 310a is moved along the inclined portion 221 of the guide 220 in a direction away from the guide 220 by the rotation of the rotary plate 200. The auxiliary license plate 210 of the rotary plate 200 is oriented downwards.

As shown in FIG. 6C, when the rotary plate 200 is further rotated in the counterclockwise direction of FIG. 6C, the locking pin 120 which has moved along the inclined portion 221 of the guide 220 is aligned with the second fastening hole 310b of the fastening member 300 and then inserted into the second fastening hole 310b by the restoring force of the elastic spring 140 which has been in the compressed state.

In conclusion, from the state in which as shown in FIG. 6A, the auxiliary license plate 210 of the rotary plate 200 is oriented towards the front of the vehicle, when the rotary plate 200 rotates 180°, as shown in FIG. 6C, the auxiliary license plate 210 of the rotary plate 200 is oriented rearwards in relation to the vehicle. Therefore, the visibility of the license plate of the vehicle can be ensured. Furthermore, in the case where the auxiliary rear lights 400 are expanded outwards in the lateral direction of the vehicle, the visibility of the rear lights of the vehicle can also be ensured.

As described above, in an auxiliary apparatus of a carrier for a vehicle according to the present invention, even if the carrier for loading a bicycle or the like on the vehicle is mounted to the rear portion of the vehicle, the visibility of a license plate and rear lights of the vehicle can be ensured, thus preventing an accident which may occur when the license plate or the rear lights of the vehicle cannot be discerned.

For convenience in explanation and accurate definition in the appended claims, the terms "front" and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An auxiliary apparatus mounted to a carrier provided on a rear portion of a vehicle, comprising:
    a locking unit fastened to the carrier, the locking unit including a locking pin to be extracted or retracted in response to operation of a switch unit;
    a rotary plate rotatably coupled to the locking unit; and
    a fastening member mounted to the rotary plate, the fastening member having at least a fastening hole into which the locking pin is selectively inserted and locked according to the operation of the switch unit;
    wherein the rotary plate is rotatably coupled to the locking unit by a rotating shaft; and
    wherein the locking unit comprises:
        a mounting bracket fastened to the carrier;
        the locking pin slidably coupled to and elastically supported on the mounting bracket by an elastic spring to one direction; and
        the switch unit connected to the locking pin through an actuating cable to extract or retract the locking pin to selectively lock the locking pin into the at least a fastening hole of the fastening member.

2. The auxiliary apparatus as set forth in claim 1, further comprising:
    auxiliary lights coupled to both ends of the rotary plate so as to be rotatable in a lateral direction of the vehicle; and
    a fastening handle fastening the corresponding auxiliary light to the rotary plate.

3. The auxiliary apparatus as set forth in claim 1, wherein an auxiliary license plate is attached to one surface of the rotary plate.

4. The auxiliary apparatus as set forth in claim 1, wherein a guide is provided on the rotary plate in a front of the at least a fastening hole of the fastening member, the guide having an inclined portion guiding an end of the locking pin into one of the at least a fastening hole when the rotary plate rotates around the rotating shaft.

5. The auxiliary apparatus as set forth in claim 3, wherein the at least a fastening hole includes a first fastening hole formed in a first end of the fastening member so that when the auxiliary license plate is oriented towards a front of the vehicle, the locking pin is locked into the first fastening hole, and a second fastening hole is formed in a second end of the fastening member so that when the rotary plate is rotated approximately 180° around the rotating shaft and oriented rearwards in relation to the vehicle, the locking pin is locked into the second fastening hole.

6. The auxiliary apparatus as set forth in claim 5, wherein a first guide is provided on the rotary plate in a front of the first fastening hole of the fastening member and a second guide is provided on the rotary plate in a front of the second fastening hole of the fastening member, the first and second guides having a respective inclined portion guiding an end of the locking pin into the first fastening hole by the second guide or into the second fastening hole by the first guide according to the rotation angle of rotary plate.

7. The auxiliary apparatus as set forth in claim 5, wherein the first fastening hole, the second fastening hole and the rotating shaft of the rotary plate are disposed on a same plane.

* * * * *